(12) United States Patent
Hesampour et al.

(10) Patent No.: US 12,409,400 B2
(45) Date of Patent: Sep. 9, 2025

(54) DEWATERING AIDS

(71) Applicant: KEMIRA OYJ, Helsinki (FI)

(72) Inventors: Mehrdad Hesampour, Helsinki (FI); Matias Penttinen, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 557 days.

(21) Appl. No.: 17/617,224

(22) PCT Filed: Jun. 5, 2020

(86) PCT No.: PCT/EP2020/065717
§ 371 (c)(1),
(2) Date: Dec. 7, 2021

(87) PCT Pub. No.: WO2020/245421
PCT Pub. Date: Dec. 10, 2020

(65) Prior Publication Data
US 2022/0249992 A1    Aug. 11, 2022

(30) Foreign Application Priority Data

Jun. 7, 2019 (EP) .................................... 19179195

(51) Int. Cl.
*B01D 37/02* (2006.01)
*B01J 20/26* (2006.01)
(Continued)

(52) U.S. Cl.
CPC ............ *B01D 37/02* (2013.01); *B01J 20/261* (2013.01); *C02F 11/121* (2013.01);
(Continued)

(58) Field of Classification Search
CPC ...... C02F 1/54; C02F 11/121; C02F 2103/16; C02F 2103/28; C02F 2103/32;
(Continued)

(56) References Cited

U.S. PATENT DOCUMENTS 4,146,473 A * 3/1979 Edelmann .............. B01D 21/01
210/729
5,185,135 A   2/1993 Pillai et al.
(Continued)

FOREIGN PATENT DOCUMENTS

EP   0 976 436   2/2000
GB   1 366 203   9/1974
(Continued)

OTHER PUBLICATIONS

Sasaki et al., JP 2005296772A, English Machine Translation, pp. 1-12 (Year: 2005).*
(Continued)

*Primary Examiner* — Claire A Norris
(74) *Attorney, Agent, or Firm* — Robin L. Teskin; Baker, Donelson, Bearman, Caldwell & Berkowitz PC (57) ABSTRACT

Disclosed are filter aids for use in industrial processes such as metal ore beneficiation dewatering and filtering processes, paper and pulp dewatering processes and sludge dewatering in municipal waste treatment. The filter aid provides increased filtering efficiency, and reduced filter cake moisture levels.

17 Claims, 2 Drawing Sheets

(51) Int. Cl.
*C02F 11/121* (2019.01)
*C02F 11/147* (2019.01)
*C02F 103/16* (2006.01)
*C02F 103/28* (2006.01)
*C02F 103/32* (2006.01)
*C08F 112/14* (2006.01)

(52) U.S. Cl.
CPC .......... *C02F 11/147* (2019.01); *C08F 112/30* (2020.02); *C02F 2103/16* (2013.01); *C02F 2103/28* (2013.01); *C02F 2103/32* (2013.01); *C02F 2303/16* (2013.01)

(58) Field of Classification Search
CPC ..... C02F 2303/16; B01D 21/01; B01D 37/03; B01D 37/02; B01D 37/025; B01J 20/26; B01J 20/261
USPC ......................................... 210/723, 728, 778
See application file for complete search history.

(56) References Cited

U.S. PATENT DOCUMENTS

2007/0056902 A1* 3/2007 Kelly ........................ C10L 5/46
                                                          210/770
2009/0026145 A1    1/2009  Hovland et al.
2018/0362371 A1   12/2018  Favero et al.

FOREIGN PATENT DOCUMENTS

| GB | 1366203 A | * | 9/1974 | ............. B01D 37/02 |
| JP | 10-101730 | | 4/1998 | |
| JP | 3260729 | | 2/2002 | |
| JP | 3460469 B2 | * | 10/2003 | ................ C02F 1/54 |
| JP | 2005-296772 | | 10/2005 | |

OTHER PUBLICATIONS

JP 3460469 B2, English Machine Translation, pp. 1-8 (Year: 2003).*
International Search Report for PCT/EP2020/065717 dated Oct. 9, 2020, 5 pages.
Written Opinion of the ISA for PCT/EP2020/065717 dated Oct. 9, 2020, 6 pages.
Office Action issued in Russian Patent Application No. 202193327 dated Feb. 6, 2023.
Artemiev et al., "Use of anionic flocculant in water treatment for flotation of apatite-nepheline ores," Journal of Vestnik Mstu, Murmansk State Technical University, vol. 23, No. 2, 2020, pp. 150-158.
Wu Chen, "Filter Aids," American Filtration and Separations Society (AFS), Eagle-Pitcher Minerals, Inc., 1970, 2 pages.

* cited by examiner

- ■ Slurry particles
- ○ Filter Media
- ○ Filter Aid

DEWATERING AIDS

This application is the U.S. national phase of International Application No. PCT/EP2020/065717 filed Jun. 5, 2020 which designated the U.S. and claims priority to European Patent Application No. 19179195.3 filed Jun. 7, 2019, the entire contents of each of which are hereby incorporated by reference.

TECHNICAL FIELD

The present invention concerns dewatering or filter aid compositions for use in mining and other industrial applications. The dewatering or filter aid composition may be used in the treatment of mineral ores after beneficiation, in oil sand dewatering, in municipal and industrial sludge dewatering including in pulp and paper manufacturing processes.

BACKGROUND OF THE INVENTION

Many industrial processes use dewatering and filtering steps, in which the water content of a bulk solid or slurry is reduced by filtering or other methods. Dewatering processes are necessary, for example, in the treatment of sludge (for example, in sludge ponds or sludge from municipal waste water treatment process), slurries and in paper-based pulp as well as in other paper treatment processes. Dewatering methods are also used in mining, for example, in dewatering of mine tailings, and metal ores. Specifically, the mining, processing and purification of naturally occurring minerals often involve one or more processing or treatment operations in which fine mesh size particles of the mineral of interest are suspended or dispersed in a continuous medium, e.g., a continuous aqueous medium, and the mineral particles are then separated from the medium. It is preferable to reduce the residual moisture content of the recovered mineral material (i.e., dewatering) to as low a value as is practicable before selling any material to a customer.

Generally, dewatering may be achieved by either mechanical means (e.g., filtration and centrifugation) or thermal drying. In general, mechanical methods are more cost effective as compared to thermal drying. However, in spite of its economic advantages, mechanical dewatering often becomes inefficient with finer particle sizes.

For example, in coal processing plants, mined coal is ground and washed to remove sulfur and gangue materials therefrom. In the fine coal circuit of such facilities fine mesh size coal (e.g., 9.5×0.6 mm; less than 0.6 mm and/or less than 0.15 mm) is recovered and dewatered using various filtering and/or drying equipment. For example, vacuum filtering equipment is often used to dewater 28×0 mesh size coal in such coal processing facilities.

In a further example, in mineral processing, minerals of value may be separated from the relatively worthless gangue by flotation in an aqueous medium. The resulting ore concentrates comprise a slurry or pulp of ore concentrates in water, often in undesirably great amounts of water. The slurry from the flotation process, having about 15-25% solids by weight, is introduced to a thickener where the solids settle and become concentrated at the bottom. Flocculants are occasionally added to the slurry to facilitate this settling process. The thickener overflow consisting of a large volume of high quality water may be returned to the mill water supply for further use. The thickened solids, typically 35% to 75% by weight, are then pumped to a filter where additional water is removed and a filter cake is built up on a filter media. The filter cake is discharged as the product while the filtrate is returned to the thickener. However, in the filtration of ore concentrated without the use of a filtration aid, the resulting filter cake is generally wet, plastic, sticky and difficult to handle.

There are generally two objectives related to the addition of filter aids. One is to form a layer of second medium which protects the basic filter medium of the system. This is commonly referred to as "precoat". The second objective of filter aids is to improve the flow rate by decreasing cake compressibility and increasing cake permeability. This type of usage is termed as "admix" or "body feed".

Thus, currently in mineral ore processing, filter aids may be used to improve processing costs by increasing filter throughput, increasing life of the filter media (as it is protected by the filter aid precoat) and increasing dry solids of the filter cake (the second objective cited above). As overall industrialization increases, the need for higher throughput filtering processes increases.

Figure 1:
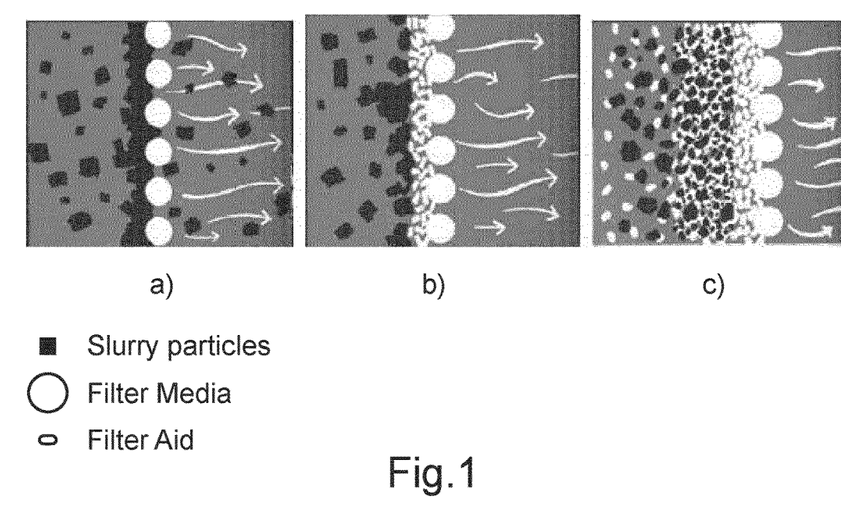
FIG. 1 is a schematic representation of filtration systems. The solid back bodies represent the solid matter (particles or fibres) in the slurry to be filtered/dewatered. The small white bodies represent the filter aid and the large white spheres represent the filter media. Panel (a) represents filtration without a filter aid, panel (b) represents filtration where the filter media has been pre-coated with the filter aid, and panel (c) presents filtration with both filter pre-coat and body feed where the filter aid is admixed with the slurry to be filtered (https://www.afssociety.org/what-are-filter-aids/).

"Filter Aids" are a group of inert materials that can be used in filtration pretreatment. Filtration without filter aid, with precoat, and with precoat and body feed is shown in FIG. 1 (https://www.afssociety.org/what-are-filter-aids/ Eagle-Pitcher Minerals, Inc., 1970). Traditionally, anionic or nonionic surfactants have been used to reduce the surface tension of the water associated with the metal ore, or other material to be dewatered. The water is thus removed more readily leading to decreased filter cake moisture. Thus, surfactants, such as sulphosuccinate esters and ethoxylated fatty alcohols are currently used as filter aids in the mineral ore processing industry. However, these surfactant filter aids have the disadvantage of staying in the filtrate (filtered water) which means that an additional step to remove the surfactant is required in the water recycling process.

Furthermore, if the processing plant uses flotation and process waters are recirculated from filtering back to flotation, the flotation process could be negatively affected by the presence of filter aids in the water. This is because the water surface properties—vital for the correct functionality in flotation—will have been modified by the filter aid.

Polymers are also widely used as filtration aids, for example, polyacrylamide block- or copolymers are commonly used, as described, for example, in U.S. Pat. No. 5,185,135. However, polyacrylamide polymers are known to cause flocculation (and are, indeed, exploited as flocculants) and this property is undesirable in a filter aid because water that is captured in flocculants is not easily released. This effect of polymers is seen especially in disc filters. Thus, polyacrylamide polymers when used as flocculation agents in metal ore processing, lead to an increase in filter cake moisture levels, even in the presence of a surfactant filter aid. Furthermore, the presence of metal ore flocculants makes filtering with, for example, a filter disk system, difficult because the flocculation causes disc filter capacity to increase and the cake thickness to increase. This results in increased filtering resistance, which again results in filter cake with high moisture.

There is especially a need to develop filtration aids suitable for all filter types for use in iron ore mining. As reserves of high grade iron ores become scarcer, it is expected that greatly increased tonnage of lower-grade iron ores will be recovered in the foreseeable future. These lower grade ores usually have to be ground to smaller particle size to liberate the valuable metal. Thus, smaller particles often block the filters which results in a loss of production and increased cost. Development of compositions, in particular dewatering aids, and methods to increase the efficiency of processing such low grade and mineral slurries are needed.

It is therefore an object of the invention to provide a filtration and dewatering aid that may be used in the mineral ore industry as well as other industries where dewatering is essential part of the process. Other industries that are in need of new dewatering or filtration aids are sludge dewatering, in, for example, municipal wastewater treatment plants, pulp dewatering in, for example, the paper industry, tailings dewatering, oil sand dewatering, mineral dewatering.

It is desired that the filtration aid is suitable for use in all commonly used filtration systems including vacuum filters, belt filters, pressure filters and centrifuges. It is also desired that the filtration aid results in an increase of the filtration rate, the minimization or elimination of solids in the filtrate, and the minimization of liquid in the filter cake.

SUMMARY OF THE INVENTION

In a first aspect of the invention, there is provided a process for dewatering a slurry comprising the following, preferably, successive, steps:
(i) Contacting at least one filter aid comprising at least one anionic polystyrene polymer and/or at least one anionic naphthalene with a slurry to be dewatered;
(ii) Filtering said slurry, for example, by passing it through a filter;
(iii) Recuperating the filter cake, eventually for further processing;
(iv) Optionally, recuperating the filtrate for further processing.

In step (i) a dosage amount of 10-500 g per ton of slurry to be dewatered may be used.

In one embodiment, the anionic polystyrene polymer is an anionic polystyrene homopolymer.

In one embodiment of the invention, the anionic polystyrene polymer (homo-polymer or co-polymer) is a polystyrene sulphonate with a molecular weight of 100 kDa-800 kDa.

In one embodiment of the invention, the anionic naphthalene is a naphthalene sulphonate, preferably a 2-naphthalene sulphonate.

In one embodiment of this first aspect of the invention, in step (i), some or all of the filter aid is admixed with the slurry before or during the filtration step (ii).

In one embodiment of this first aspect of the invention, in step (ii), the filter has been pre-coated with some or all of the filter aid.

In one embodiment of this first aspect of the invention, in step (i), a partial amount of the dosage amount of the filter aid is admixed with the slurry and the filter of step (ii) has been pre-coated with the remaining dosage amount of filter aid.

In one embodiment of this first aspect of the invention, the slurry to be dewatered is chosen from a metal ore slurry, preferably an iron ore slurry, an oil sand slurry, a municipal waste water sludge, or a vegetal pulp. This vegetal pulp may be destined for use in paper manufacture.

In one embodiment of this first aspect of the invention, the slurry to be dewatered is chosen from a food and/or beverage sludge or pulp.

In one embodiment of this first aspect of the invention, the filter cake is further pelletized.

In one embodiment of this first aspect of the invention, the filter cake is further processed as a paper precursor.

In a second aspect of the invention, there is provided the use of at least one anionic polystyrene homopolymer and/or at least one anionic naphthalene as a filter aid in a slurry dewatering process.

In one embodiment of this second aspect of the invention, the anionic polystyrene homopolymer is a polystyrene sulphonate with a molecular weight of 200 kDa-400 kDa.

In another embodiment of this second aspect of the invention, the at least one anionic naphthalene is a naphthalene sulphonate, preferably is a 2-naphthalene sulphonate.

In one embodiment of this second aspect of the invention, the anionic polystyrene homopolymer and/or the anionic naphthalene are present in the form of an alkali metal alkali earth metal or ammonia salt, preferably, a sodium salt.

In one embodiment of this second aspect of the invention, the filter aid is dosed at an amount of 10-500 g (in the solid form) per ton of material to be filtered.

The filter aids are generally useful as filtering/dewatering aids in mining applications and in other industrial applications. They are also useful as filter aids in other industrial applications such as municipal sludge dewatering, oil sand dewatering, oil sand dewatering, pulp dewatering food and beverage sludge/pulp dewatering and other filtering/dewatering applications in waste treatment and the pulp and paper industry. In one embodiment, the filter aid is used to dewater pulp to produce a paper precursor.

DETAILED DESCRIPTION

As used in this specification, the words "comprises", "comprising", and similar words, are not to be interpreted in an exclusive or exhaustive sense. In other words, they are intended to mean "including", but not limited to.

As used herein "dewatering" means the removal of water from solid, semi solid (for example pulp or gel) material, or soil or a slurry by any process suitable for industrial application.

The various exemplary embodiments disclosed herein generally relate to methods for filtering and dewatering in industrial processes. Exemplary methods may generally comprise the use of one or more filter aids according to any embodiment of the invention to filter an aqueous suspension, slurry, or pulp. The present embodiments also generally relate to a product that may be produced by any of the methods described herein.

As used herein, "amphoteric polyacrylamide agent" (AmPAM) refers to an amphoteric polyacrylamide linear water-soluble polymer.

As used herein, the term "slurry" refers to any flowable suspension of particles or fibres in liquid. As used herein, the term "slurry" may refer to, for example a metal ore slurry, iron ore slurry, or a mineral ore slurry, for example, coal slurry, or an oil sand slurry. The term "slurry" may refer to a flowable sludge, for example a waste water sludge, or a cellulose pulp. Such a pulp may be dewatered, for example in the paper manufacturing industry.

As used herein, the term "nonionic monomer" generally refers to a monomer that possesses a neutral charge. Exemplary nonionic monomers may comprise but are not limited to comprising monomers selected from the group consisting of acrylamide ("AMD"), methacrylamido, vinyl, allyl, ethyl, and the like, all of which may be substituted with a side chain selected from, for example, an alkyl, arylalkyl, dialkyl, ethoxyl, and/or hydrophobic group. In an exemplary embodiment, a nonionic monomer may comprise AMD.

As used herein, the term "anionic monomers" may refer to either anionic monomers that are substantially anionic in whole or (in equilibrium) in part, at a pH in the range of about 6.0 to about 8.0. The "anionic monomers" may be neutral at low pH (from a pH of about 2 to about 6), "Anionic monomers" may also refer to anionic monomers that are anionic at low pH.

Examples of anionic monomers useful in the present invention are detailed below.

As used herein, the terms "polymer", "polymers", "polymeric" and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, for example, polymerizing, a particular monomer. Unless otherwise specified, a polymer may also comprise a "copolymer" that may comprise two or more different recurring units that may be formed by, for example, copolymerizing, two or more different monomers, and/or by chemically modifying one or more recurring units of a precursor polymer. Unless otherwise specified, a polymer or copolymer may also comprise a "terpolymer" which generally refers to a polymer that comprises three or more different recurring units.

Dewatering/Filter Aids and Compositions Comprising Them

The present inventors have identified two groups of molecules for use as filtering/dewatering aids. The inventors have also identified compositions comprising these molecules that are highly effective filter aids. The two groups of molecules, Group I and Group II, have superior qualities to molecules traditionally used as filter aids. Specifically, the inventors have found that Group I molecules, anionic polymers of styrene monomers, and, in particular, polystyrene sulphonates, and Group II molecules, naphthalene sulphonates, provide superior results in terms of reduced water throughput time and reduced filter cake moisture, compared to known filter aids, traditionally used in industry.

The two groups of molecules are described in detail below.

Group I: Anionic Polymers of Styrene Monomers

The inventors have identified that anionic polystyrene polymers otherwise known as anionic polymers of styrene monomers, are generally advantageous filtering/dewatering aids compared to traditional filter aids like monomeric surfactants and acrylamide based polymers. These polymers may be homopolymers or copolymers. The inventors have identified that anionic polystyrene homopolymers, otherwise known as anionic homopolymers of styrene monomers are especially advantageous.

Anionic homopolymers of styrene monomers may be synthetized by methods known to the skilled person, for example, by the homopolymerization of anionic styrene monomers. Examples of anionic groups that can be present in the anionic styrene monomer include groups carrying an anionic charge and acid groups carrying an anionic charge when dissolved or dispersed in water, the groups herein collectively being referred to as anionic groups, such as sulphonic acid, sulphonate, phosphate, phosphonate, sulphate, carboxylic acid, carboxylate, alkoxide and phenolic groups, i.e. hydroxy-substituted phenyls and naphthyls. Groups carrying an anionic charge may be salts of an alkali metal, alkaline earth metal or ammonia.

For example, the anionic styrene monomers may comprise a sulfonic function that may comprise, for example, 2-acrylamido-2-methylpropane sulfonic acid ("AMPS").

According to a preferred embodiment, the anionic monomer is styrene sulphonate.

Similarly, anionic copolymers of styrene monomers may be synthetized by methods known to the skilled person.

Anionic homo- or copolymers of styrene monomers may also be synthetised by the derivatisation of the styrene polymer with the appropriate anionic group. Homopolymers are preferred. As a suitable ionic group, we may cite any of the anionic groups previously mentioned, for example, sulphonic acid, sulphonate phosphate, phosphonate, sulphate, carboxylic acid, carboxylate, alkoxide and phenolic groups, i.e. hydroxy-substituted phenyls and naphthyls. The sulphonate group is especially preferred.

For example, polystyrene sulphonate may be prepared by the sulphonation of polystyrene:

Several methods known to the skilled person exist for this conversion.

In the latter case, the particular conditions under which the polystyrene sulfonation takes place (for example, by electrophilic aromatic substitution in a heated acid medium) may lead to competition of multiple parallel reactions, resulting in double substitutions on the phenyl nuclei, and sulfonation rates of less than 100%, as well as crosslinking between sulfonyl groups.

Generally, if the anionic polystyrene is produced by derivatising a pre-formed polymer, the degree of anionic group derivatisation is preferably greater than 70%, for example greater than 75%, or greater than 80%, or greater than 85%, or greater than 90%, or greater than 95%.

According to one embodiment of the invention, when the anionic group is a sulphonate group, the degree of sulphonation of the polymer is greater than 70%, or is greater than 75%, is greater than 80%, or greater than 85%, or greater than 90%, or greater than 95%.

Generally, the anionic co- or homopolymer of styrene monomers is not crosslinked, but according to some embodiments of the invention it may be crosslinked.

Generally, because the sulfonic acid group (SO₃H) is strongly acidic, various salts of the polymer can be prepared, leading to sodium, calcium, and other salts. Thus, the polystyrene sulphonate may be present in the form of an alkaline (e. g. Na$^+$; K$^+$) or alkaline earth metal (e.g. Ca$^{2+}$) or ammonia salt.

For example, the reaction may be represented as follows:

According to one embodiment of the invention, the anionic polystyrene has a molecular weight in range 100,000-800,000 g/mol, preferably, 200,000-500,000 g/mol, more preferably 300,000-450,000 g/mol, when measured using for example size exclusion chromatography (SEC). This may also be expressed as a molecular weight of 100-800 kDa, 200-500 kDa, more preferably 300-450 kDa. Generally, the average molecular mass (Mn) may be preferably in the range 30,000 g/mol-150,000 g/mol.

Generally, the anionic polystyrene may have a product viscosity range of 700-2300 CP. According to one embodiment of the invention, the anionic polystyrene has a product viscosity range of 750-2210 CP. According to a preferred embodiment of the invention, the anionic polystyrene has a product viscosity range of 1000-1700 CP for a product with approximately 18-22% solids. The viscosity values quoted are those using a Brookfield DV1 viscometer with a small sample adapter measured at 20° C., and 30 rpm and a spindle SC4-31.

According to one embodiment of the invention, the anionic polystyrene comprises a sulphonate group as the anionic group. According to a preferred embodiment of the invention, the anionic polystyrene filter aid is a cationic salt of sulphonate polystyrene. For example, we may cite the sodium or potassium salts of the homopolymer of sulphonate styrene. According to a preferred embodiment of the invention, the polystyrene sulphonate is the homopolymer of sodium styrene sulphonate and has a viscosity in the range of 750-2200 CP, preferably 1000-1700 CP with a solid content of approximately 16-26%, preferably 18-22% w/w. As a suitable polystyrene sulphonate for use a filter aid, we may cite KemECal 6794® available from Kemira (Helsinki, Finland).

With respect to the effective dosage amount, Group I filter aids may be used generally in the range of 10-500 g per ton of slurry to be filtered. Dosage amounts are referred to as the amount of solid filter aid provided (or the equivalent amount of solid filter aid if the filter aid is provided in the form of a suspension or other non-solid physical form).

The specific dosage range may be adjusted according to the initial moisture content in the slurry to be filtered, the slurry particle size distribution and the particle specific surface area. The skilled person knows how to perform this adjustment. Group I filter aids may be dosed for example in amounts of, for example, 10-400 g, 20-300 g, 40-200 g, 50-100 g, or 60-70 g per ton of slurry to be filtered. For example, a dosage amount of 15 to 60 g, or 15 to 40 g of solid filter aid per ton of material to be filtered, may be used. According to one embodiment of the invention, a dosage amount of 18 to 35 g per ton, preferably 20 to 30 g per ton with respect to the slurry to be dewatered is used. According to a preferred embodiment of the invention, the Group I filter aids are used at a dosage of about 20 g per ton with respect to the material to be filtered. The filter aid may be added in the form of a solid, suspension, slurry, solution or any convenient form, to the material to be filtered.

Group II: Naphtalene Sulphonates

The inventors have found that naphthalene sulphonates are efficient filtering/dewatering aids. In the present invention, "naphthalene sulphonate" may refer to naphthalene sulphonic acid or a salt thereof. Preferably, salts of naphthalene sulphonic acid are employed, for example alkaline (e. g. Na$^+$, K$^+$) or alkaline earth metal (e.g., Ca$^{2+}$) or ammonia salts. According to a preferred embodiment of the invention, the naphthalene sulphonate is an alkali metal salt of 2-naphthalenesulfonate, preferably, a sodium salt. For example, sodium 2-naphthalenesulfonate (CAS Number: 532-02-5) is commercialized by Merck, Darmstadt, Germany.

According to one embodiment of the invention, the naphthalene sulphonate is 1-napthalenedisulphonic acid (CAS Number: 85-47-2) or salt thereof.

According to one embodiment of the invention, the naphthalene sulphonate is 1,6-napthalenedisulphonic acid (CAS Number: 525-37-1) or salt thereof.

According to one embodiment of the invention, the naphthalene sulphonate is 2,6-napthalenedisulphonic acid (CAS Number: 581-75-9) or salt thereof.

According to one embodiment of the invention, the naphthalene sulphonate may be a mixture of one or several of the pre-cited molecules.

According to one embodiment of the invention, the naphthalene sulphonate is provided as a solid, a slurry or in the form of a solution.

According to a preferred embodiment of the invention, the naphthalene sulphonate is provided in the solid form.

With respect to the dosage amount, Group II filter aids, naphthalene sulphonates, may be used in the range of 10-400 g per of ton of slurry to be filtered. As was mentioned for Group I molecules, the skilled person knows how to adjust the dosage amount according to the specific slurry he is working with. The filter aids of Group II may be for example dosed at 20-300 g, 40-200 g, 50-100 g, 60-70 g per ton of slurry to be filtered. For example, a dosage amount of 150 g, or 100 g of solid filter aid per ton of material to be filtered, may be used. For example, 50 to 80 g per ton, 10-40 g per ton of slurry to be filtered may be used. According to a preferred embodiment of the invention, the Group II filter aid is used at a dosage of about 20 g of naphthalene sulphonate per ton with respect to the material to be filtered. According to a preferred embodiment of the invention, the Group II filter aids are used at a dosage of about 20 g per ton with respect to the slurry to be dewatered. The filter aid may be added in the form of a solid, suspension, slurry, solution or any convenient form, to the slurry to be dewatered.

According to one embodiment of the invention, a mixture of one or more molecules from Group I and/or one or more molecules from Group II may be present as the filter aid. Thus, the invention relates to the above described filter aids and compositions comprising them. Generally, the compositions may comprise one or more filter aids from Group I and/or one or more molecules from Group II. The filter aid composition may also comprise other molecules or mixtures thereof (also known as filter agents) having filter aid properties.

Thus, according to one embodiment of the invention, the filter aid composition comprises at least one polystyrene sulphonate. According to one embodiment of the invention, the filter aid composition comprises at least one naphthalene sulphonate. According to one embodiment of the invention, the filter aid composition comprises a mixture of at least one polystyrene sulphonate and at least one naphthalene sulphonate. According to a preferred embodiment of the invention, the filter aid composition comprises an alkaline metal or ammonium salt of a polystyrene sulphonate and/or an alkaline metal or ammonium salt of 2-naphthalenesulphonate. Preferably, the alkaline metal is sodium or potassium. According to one embodiment of the invention, the filter aid composition comprises the sodium salt of a polystyrene sulphonate. According to one embodiment of the invention, the filter aid composition comprises the sodium salt of a naphthalene sulphonate. According to a preferred embodiment of the invention, the filter aid composition comprises sodium polystyrene sulphonate and/or sodium 2-naphthalenesulphonate.

According to a preferred embodiment of the invention, the filter aid composition comprises sodium polystyrene sulphonate and sodium 2-naphthalenesulphonate present, for example, in a ratio, 5:95-95:5, or 10:90-90:10, or 20:80-80:20, or 30:70-70:30, or 40:60-60:40, or 50:50. According to one embodiment of the invention, the filter aid composition comprises sodium polystyrene sulphonate and optionally, sodium 2-naphthalenesulphonate, present in a ratio of 100:0-50:50.

According to one embodiment of the invention, the filter aid composition may comprise at least one additional filter aid agent that is not an anionic polymer of a styrene monomer or a naphthalene sulphonate. This additional filter agent may be for example, a surfactant, such as a sulphosuccinate ester, or an ethoxylated fatty alcohol. It may also be a polyacrylamide filter agent, including, for example anionic, cationic or amphoteric or non-ionic polyacrylamide block- or copolymers. It may also be a polyamine having filter aid properties, for example, a cationic polyamine, or mixtures thereof.

According to one embodiment of the invention, the composition may comprise at least one anionic polymer of a styrene monomer and/or at least one naphthalene sulphonate, in combination with at least one cationic polyamine. According to one embodiment of the invention, the composition may comprise at least one anionic polymer of a styrene monomer and/or at least one naphthalene sulphonate, in combination with an anionic polyacrylamide block or copolymer. According to one embodiment of the invention, the composition may comprise at least one anionic polymer of a styrene monomer and/or at least one naphthalene sulphonate, in combination with a surfactant, such as a sulphosuccinate ester, or an ethoxylated fatty alcohol, for example ethoxylated isotridecanol.

Technical Effect of the Filter Aid

Surprisingly, the inventors have found that the molecules from Group I and Group II have excellent filtering capabilities, with reduced water throughput time and reduced filter cake moisture, compared to a known filter aids. Furthermore, both Group I and Group II filter aids may be used to form a layer of second medium ("precoat") protecting the basic filter medium of the filtering system.

The molecules can thus be used as effective filter aids in all conventional filtering systems, including, but not exclusively, in mining oil sand, paper and pulp applications, food and beverage pulp dewatering and in sludge dewatering in municipal/industrial wastewater treatment.

Generally, the filter aids may be used with any conventional filters including rotary (disc and drum) and horizontal belt filters, magnetic filters or pressure filters.

In a set of experiments described in Example 1, the inventors show that the filter aids according to the present invention have advantageous effects, with decreased water throughput time to achieve a moisture content of about 10%. Furthermore, the data also show that, according to one embodiment of the invention, a polystyrene sulphonate filter aid may be dosed at relatively low amounts, at 20 g per ton. A reduced dosage amount is advantageous for industrial applications, thereby reducing processing time and costs. The inventors have observed that a dosage of 30 g per ton of a surfactant filter aid, ethoxylated isotridecanol, required a much longer water throughput time compared to the water throughput time obtained with Group I filter aid according to one embodiment of the invention, and is therefore less efficient than the filtrate according to one embodiment of the invention.

The data of Table 2 also show that the filter aid according to one embodiment of the invention, a sodium salt of a polystyrene sulphonate having a molecular weight range of 200 kDa-450 kDa, such as 300 kDa-450 kDa, as measured by size exclusion chromatography (SEC) (KemECal B6794®), has a superior performance, compared to a high molecular weight nonionic polyacrylamide emulsion agent, or an amphoteric polyacrylamide agent. While the high molecular weight nonionic polyacrylamide agent resulted in a reduced filtering time, the filter became blocked and a considerably higher filter cake moisture content was reported, compared with that reported for the filter cake obtained with the filter aid according to one embodiment of the invention. The increased cake moisture obtained with the high molecular weight non-ionic polyacrylamide emulsion agent is a sign of a heavy undesired flocculation. Similarly, the amphoteric polyacrylamide agent resulted in a considerably wetter filter cake, compared to the filter aid according to one embodiment of the invention.

By contrast, the test results show that the filter aid according to one embodiment of the invention has an excellent performance in the filtering application. No flocculation is observed with this filter agent.

The filter aid according to the invention generally has excellent filterability and does not lead to flocculation of the material being filtered. Therefore, the filter aid may generally be used without clogging the filter or without increasing the moisture content of the filter cake as has been observed with other known polyacrylamide polymer agents.

The polymeric filter aid according to one embodiment of the invention generally stays in the filter cake during and after the filtration and, therefore, remains absent from the filtrate. This means that the filtrate (usually water) may be reprocessed/reused directly without having to remove residual filter aid. This represents a considerable advantage in terms of time and cost savings.

Applications

The filter aids of the present invention may be used in most industrial dewatering and filtering applications such as filtering wet mineral ore before or after beneficiation processes, sludge dewatering, pulp dewatering, filtering and oil sand dewatering. The filter aids of the present invention may be used in most food and beverage pulp dewatering processes.

In metal ore dewatering processes, the filter aids according to one embodiment of the invention are especially advantageous, because they stay in the filter cake. For example, in iron ore processing, the filter cake may then be used directly, transformed into a format that may be valorized efficiently, e.g. by being pelletized, and easily transported. It is known that classical surfactant filter aids may have a negative effect on pelletizing. By contrast, the filter aids of Group I generally have a positive effect on pelletizing which is advantageous.

In another aspect, the present invention concerns a filtering or dewatering process, wherein substrate, for example, a metal ore slurry is dewatered, at least in part, by filtering it in the presence of at least one filter aid according to an embodiment of the invention.

The process comprises the following steps:
i) Contacting at least one filter aid defined herein above with the slurry to be filtered;
ii) Passing the slurry to be dewatered through a filter;
iii) Recuperating the filter cake for further processing;
iv) Optionally recuperating the filtrate, optionally for further processing.

In step (i) generally, the dosage amount of the filter aid is admixed with the slurry before, or during the filtration step. Also, it is possible that, in step (i), the filter material is pre-coated with the correct dosage amount of filter aid. In one embodiment of the invention, both of those options for step (i) may be used. In this case, step (i) is carried out by admixing a partial amount of the dosage amount of the filter aid with the slurry to be filtered before, or during the filtration step, and the filter is pre-coated with the remaining dosage amount of filter aid. Suitable dosage amounts of filter aid are described above. Generally, a dosage range between 10-400 g/ton of slurry to be dewatered may be used. Filter aids may be dosed, for example in amounts of, for example, 10-400 g, 20-300 g, 40-200 g, 50-100 g, 60-70 g per ton of slurry to be filtered. For example, a dosage amount of 15 to 60 g, or 15 to 40 g of solid filter aid per ton of material to be filtered, may be used.

Generally, the slurry to be dewatered is chosen from a mineral or metal ore slurry, preferably an iron ore slurry, a municipal waste water sludge, or a vegetal pulp for further processing to make paper.

According to one embodiment of the invention, the filter cake is a mineral or metal ore that is further pelletized.

According to one embodiment of the invention, the filter cake may be a cellulose, beetroot, potato or other vegetal pulp that is further processed, for example for use in the paper industry, for example, as a paper precursor. In this case, the pulp may be any cellulose or any suitable vegetal pulp.

The invention is further described with reference to the following examples. It will be appreciated that the invention as claimed is not intended to be limited in any way by these examples.

EXAMPLES

Example 1

Laboratory scale comparative tests. Dewatering aid tests on a number of reagents were carried out.

Method

Figure 2:
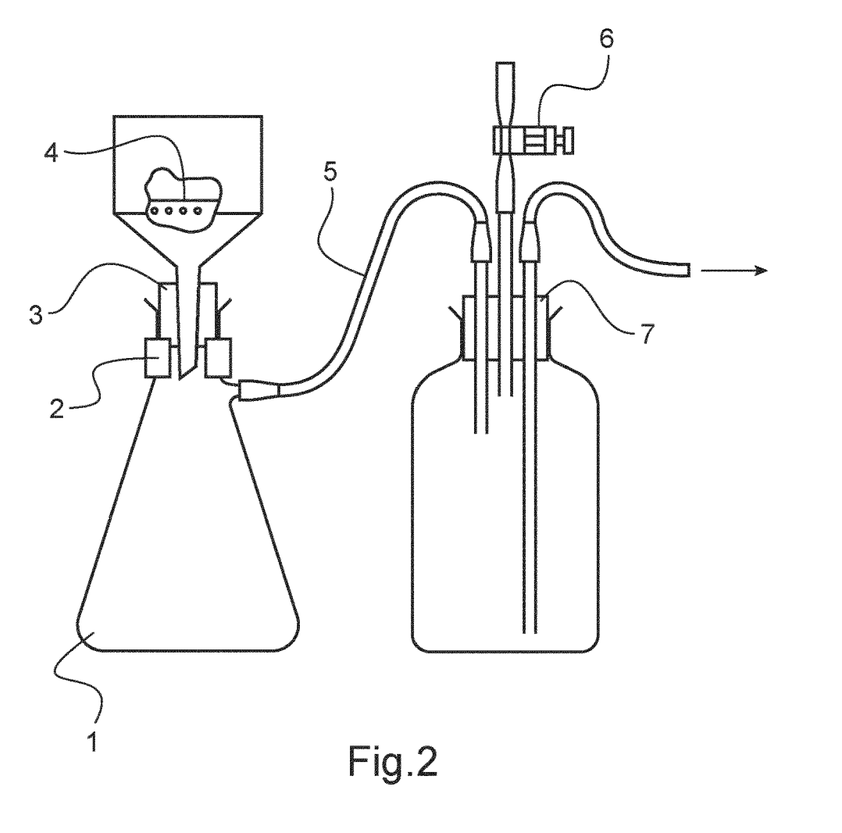
FIG. 2 is a schematic representation of the tests of Example 1. Büchner funnel equipment was used to measure the efficacy of several agents for their use as a filter aid. The numbered features (1) to (7) are (1) a thick-walled filter flask (Büchner flask), (2) a clamp, (3) a Neoprene adapter, (4) a sheet of flat filter paper, (5) a thick-walled rubber tubing, (6) a vacuum release tap and (7) a trap. The arrow indicates the direction of the vacuum pull.

The experimental setup is shown in FIG. 2. The tests were performed using a Büchner funnel setup, as known in the art, with the specified reagents. Mineral (iron) ore slurry samples were prepared by adding 2 kg of a mineral slurry (50% solids content) to a beaker under mixing at 300 rpm using an overhead mixer. A reagent (see Tables 1 and 2) was added and mixed with the slurry for 1 minute. In Table 1, the surfactant product, which is an ethoxylated isotridecanol (CAS 69011-36-5), and a filter aid according to one embodiment of the invention, a homopolymer of sodium styrene sulphonate, KemECal 6794®, commercialized by Kemira (Helsinki, Finland), were compared. Each filter aid was added in the undiluted form. The slurry and filtration aid mixture was stirred for 60 seconds, after which the mixture was poured onto the Büchner funnel under vacuum. The vacuum was adjusted to 0.78 bar, simulating industrial conditions.

The reference experiment was carried out without a filter aid. The time it took for the mineral cake surface to dry was recorded (in seconds). This is a visual observation which is a measure of dewatering speed. After the surface was dry, the filtering experiment was continued for an additional 20 seconds. The surface drying time plus the additional 20 seconds extra filtering was set as the total filtering time for each experiment. The total filtering time was set to be the same for all experiments, because an industrial disc filter has the same rotation speed regardless if it uses a filter aid or not, and therefore the filtering time remains unchanged in all conditions and any differences in results are due only to the filter aid used.

Filtration performance was measured visually by evaluating the surface drying time. Additionally, the end moisture percentage of the cake was measured immediately after filtration. The whole filter cake (approximately 1100 grams in weight), was placed on a metal plate and weighed, after which the filter cake was placed overnight in an oven at least 105° C. or more than 16 hours. After drying, the cake and plate was reweighed, and from this result, the moisture percentage was calculated for each filter cake.

The surfactant, ethoxylated isotridecanol (CAS 69011-36-5) 90-100%, was dosed 100 g/ton, and, therefore, the active agent dose was 90-100 g/ton.

The experimental product, homopolymer of sodium styrene sulphonate, was dosed 100-150 g/t as product. As the active agent concentration in the product is approximately 20%, this mean the active agent dose was between 20-30 g/ton.

In a second set of comparative experiments, several reagents were compared at the same dosage amount (see Table 2).

Results

Table 1 below shows the first set of test results. The filter aid according to one embodiment of the invention, homopolymer of sodium styrene sulphonate, gave similar results to the reference surfactant product ethoxylated isotridecanol (CAS 69011-36-5), but with only 30% of the dosage used.

Therefore, the filter aid, according to one embodiment of the invention, a homopolymer of sodium styrene sulphonate, is more effective than the fatty alcohol surfactant ethoxylated isotridecanol as a filter aid.

TABLE 1

Performance of homopolymer of sodium styrene sulphonate vs. surfactant (ethoxylated isotridecanol (CAS 69011-36-5)), at different product dosages.

| Product | Dosage, g/T (as active) | Surface dry (Sec) | Moisture (oven) % |
|---|---|---|---|
| Ref (no filter aid) | 0 | 90 | 10.41 |
| ethoxylated isotridecanol (CAS 69011-36-5) | 100 | 84 | 8.77 |
| homopolymer of sodium styrene sulphonate | 30 | 78 | 9.00 |

In this experiment, the required moisture content, of about less than 10%, was achieved in about the same time but with only one third of the product.

Table 2 below presents the results of another experiment in which the performance of a filter aid according to one embodiment of the invention (homopolymer of sodium styrene sulphonate, KemECal B-6794®) was compared with that of the following with traditional filter aids: surfactant ethoxylated isotridecanol (CAS 69011-36-5), a high molecular weight non-ionic emulsion polyacrylamide (commercially available as SPAM E 5083® from Kemira, Helsinki, Finland) and an amphoteric polyacrylamide agent (commercially available as Fennosil55 D® from Kemira, Helsinki, Finland). Equal dosage amounts for each agent were used. The filter cake moisture level is indicated in the far right-hand column and the time it took to reach a visibly dry filter cake surface is indicated in seconds.

The homopolymer of sodium styrene sulphonate give a far superior result at 30 g/ton compared to the other agents tested. Specifically, to reach a filter cake moisture level of 10.2%, the filter aid, according to one embodiment of the invention, required only 79 seconds, whereas the surfactant, ethoxylated isotridecanol, required 90 seconds to reach a moisture level of 10.61%.

TABLE 2

Comparison of various filter aids

| Product | Dosage, g/T (as active) | Surface dry (Sec) | Moisture (oven) % |
|---|---|---|---|
| Ref (no filter aid) | 0 | 93 | 10.89 |
| Ethoxylated isotridecanol (CAS 69011-36-5) | 30 | 90 | 10.61 |
| homopolymer of sodium styrene sulphonate (KemECal B-6794 ®) | 30 | 79 | 10.20 |
| homopolymer of sodium styrene sulphonate (KemECal B-6794 ®) | 20 | 68 | 9.90 |
| High Mol. Wt. nonionic emulsion polyacrylamide (EPAM E 5083 ®) | 30 | 46 | 14.22 |
| amphoteric polyacrylamide agent (Fennosil55 D ®) | 30 | 63 | 11.31 |

The high molecular weight (in the range of several million Da) polyacrylamide agent and the amphoteric polyacrylamide agent performed poorly. The high molecular weight nonionic polyacrylamide emulsion agent only reached a minimum moisture level of about 14%. The amphoteric polyacrylamide agent reached a moisture level of about 11%.

By contrast, the inventors also noted that the homopolymer of sodium styrene sulphonate® does not generate a significant flocculation effect. This is seen by only a slight improvement in surface dry time compared to the reference. This effect was surprising as polymeric agents usually generate flocculation.

Example 2

Laboratory scale comparative tests. Dewatering aid tests with polystyrene polymers having different molecular weight.

The tests were carried out similarly as Example 1 with iron ore.

The tested polymers have a similar chemical structure (homopolymer of sodium styrene sulphonate), but a different molecular weight.

Figure 3:
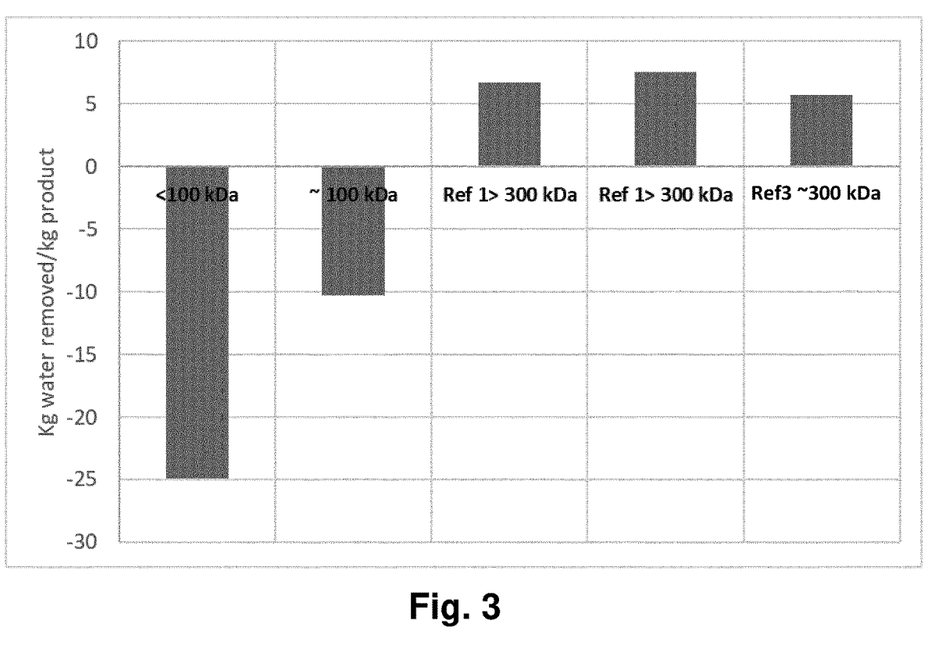
FIG. 3 is a diagram comparing the kg of water removed per kg of product depending on the molecular weight of the polymer used.

The cake dryness of reference sample (without any filter aid) and polymer samples are presented in Table 3 below and in FIG. 3.

TABLE 3

Comparison of cake dryness for reference sample and different polymers

| | Dosage [g/t] | Water out [g] | Dry solid [%] |
|---|---|---|---|
| Reference sample | 0 | 785.85 | 89.85 |
| <100 kDa | 50 | 770.6 | 88.60 |
| ~100 kDa | 50 | 787.4 | 89.33 |
| Ref 1 > 300 kDa (batch A) | 50 | 800.2 | 90.18 |
| Ref 1 > 300 kDa (batch B) | 50 | 800 | 90.22 |
| Ref 3~300 kDa | 50 | 797.3 | 90.13 |

The results show dryness of cake is improved when polymer MW is greater than 100 kDa preferably 300 kDa.

The invention claimed is:

1. Process for dewatering a slurry comprising the following successive steps:
   (i) contacting at least one filter aid composition comprising at least one anionic polystyrene sulphonate homopolymer having a molecular weight in the range 100 kDa-500 kDa with a slurry to be dewatered, at a dosage range of 10 to 500 g per ton of slurry to be dewatered, the slurry being a wet mineral ore slurry or a metal ore slurry;
   (ii) filtering said slurry by passing said slurry through a filter; and
   (iii) recovering a filter cake,
   wherein the anionic polystyrene sulphonate homopolymer has a viscosity ranging from 700-2300 cP determined using a Brookfield DV1 viscometer at 20° C., 30 rpm, and a spindle SC4-31, and
   wherein the anionic polystyrene sulphonate homopolymer does not lead to flocculation of the slurry being filtered.

2. The process of claim 1, wherein the anionic polystyrene sulphonate homopolymer has a molecular weight in the range 300 kDa-450 kDa.

3. The process of claim 1, wherein the filter aid further comprises an anionic naphthalene polystyrene homopolymer.

4. The process of claim 1, wherein, in step (i), some or all of the filter aid composition is admixed with the slurry to be dewatered.

5. The process of claim 1, wherein the filter of step (ii) is pre-coated with some, or all of the filter aid composition.

6. The process of claim 1, wherein the filter cake is further pelletized.

7. The process of claim 1, further comprising recovering the filtrate for further processing.

8. The process of claim 1, further comprising further processing the recovered filter cake.

9. The process of claim 1, wherein the wet mineral ore slurry or metal ore slurry to be dewatered is an iron ore slurry.

10. The process of claim 1, wherein the at least one anionic polystyrene sulphonate homopolymer is present at a dosage amount of 18-35 g per ton.

11. The process of claim 1, wherein the anionic polystyrene sulphonate homopolymer is present in the form of a sodium salt.

12. A process for dewatering a slurry, which comprises treating the slurry with a filter aid comprising at least one anionic polystyrene sulphonate homopolymer having a molecular weight in the range 200 kDa-500 kDa, wherein the slurry dewatering process is a wet mineral ore dewatering process or a metal ore dewatering process, and wherein the filter aid is present at a dosage amount of 10-500 g per ton of slurry to be filtered, wherein the anionic polystyrene sulphonate homopolymer has a viscosity ranging from 700-2300 cP determined using a Brookfield DV1 viscometer at 20° C., 30 rpm, and a spindle SC4-31, and wherein the anionic polystyrene sulphonate homopolymer does not lead to flocculation of the material being filtered.

13. The process of claim 12, wherein the anionic polystyrene sulphonate homopolymer has a molecular weight of 300 kDa-450 kDa.

14. The process of claim 12, wherein the filter aid further comprises an anionic naphthalene polystyrene homopolymer.

15. The process of claim 12, wherein the anionic polystyrene sulphonate homopolymer is present in the form of an alkali metal, alkali earth metal or ammonia salt.

16. The process of claim 12, wherein the at least one anionic polystyrene sulphonate homopolymer is present at a dosage amount of 18-35 g per ton.

17. The process of claim 12, wherein the anionic polystyrene sulphonate homopolymer is present in the form of a sodium salt.

* * * * *